J. T. WILSON.
PISTON VALVE.
APPLICATION FILED JAN. 7, 1909.
957,286.
Patented May 10, 1910.
2 SHEETS—SHEET 1.
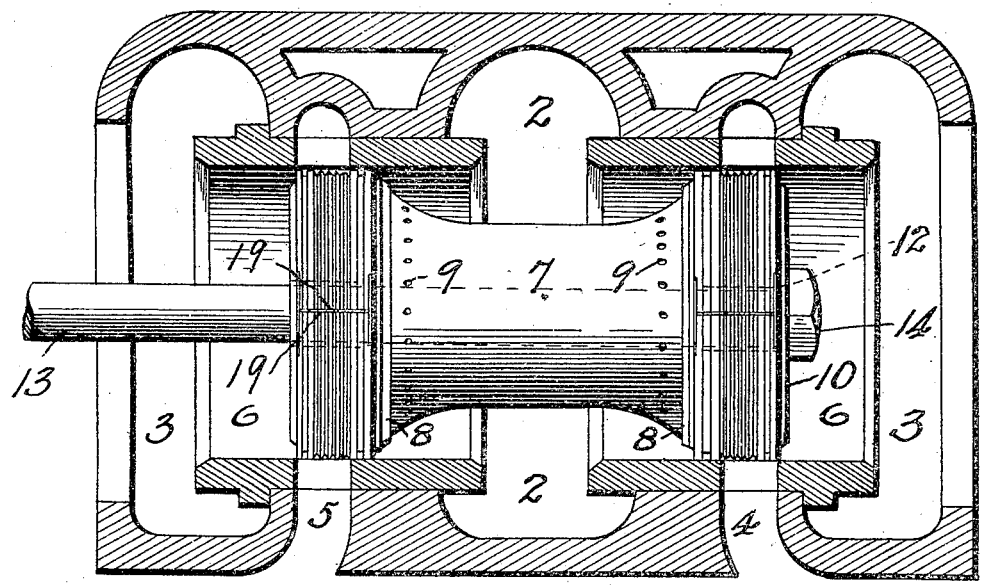
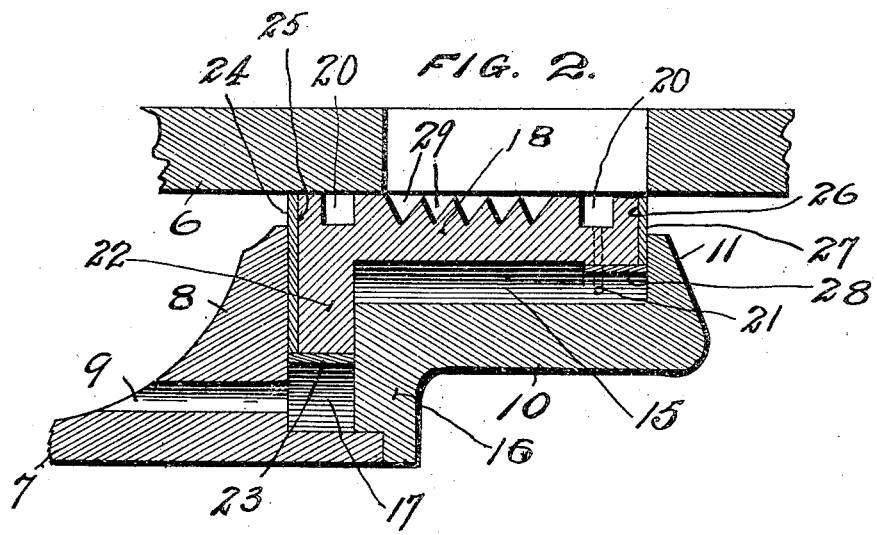
WITNESSES
C. N. Davies.
Ralph Wornelle
INVENTOR
J. T. Wilson
By F. E. Stebbins, Attorney

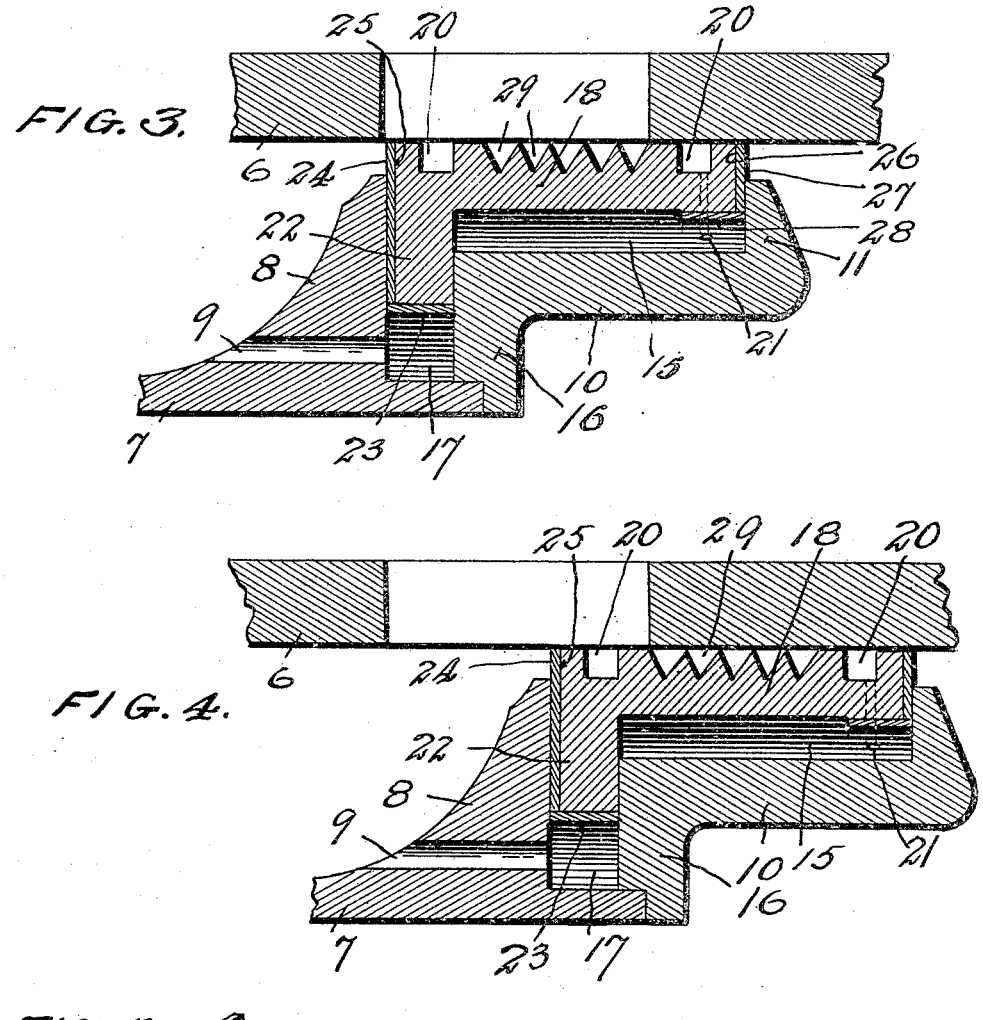

UNITED STATES PATENT OFFICE.

JOHN T. WILSON, OF JERSEY SHORE, PENNSYLVANIA.

PISTON-VALVE.

957,286. Specification of Letters Patent. Patented May 10, 1910.

Application filed January 7, 1909. Serial No. 471,141.

*To all whom it may concern:*

Be it known that I, JOHN T. WILSON, a citizen of the United States, residing at Jersey Shore, in the county of Lycoming and State of Pennsylvania, have invented certain new and useful Improvements in Piston-Valves; and I do hereby declare the following to be a full, clear, and exact description of the invention, such as will enable others skilled in the art to which it appertains to make and use the same.

My invention relates to piston valves, and in particular to the packing rings thereof, the object being the provision of a valve which will substantially be balanced to a predetermined percentage of frictional area of ring under pressure against the cage throughout all positions of its travel.

The piston valve as commonly used consists of two or three spring metal rings turned larger than the valve chamber so the ring or rings will be under tension when forced into the cage or chamber. The steam is allowed to get under these rings so that each is forced against the cage at all times by full steam pressure, and as a result the valve chamber is unduly worn at the center of the valve travel by reason of the valve traveling much more at this position while the engine is working at less than full stroke or at what is known as "cut off." Now, since the cut off must vary in accordance with the load, it is evident that the wear of the cage is very uneven and excessive leakage results. Wide packing rings which were expansible could not be used because of the increased friction caused by the increased bearing surface of the ring with steam pressure expanding it against the cage. Such a valve would be an absolutely unbalanced one and the ordinary piston valve is balanced only to the extent of the decrease of the frictional contact by reduction of width of rings. Therefore, I desire to produce a wide ring valve packing which, by virtue of the ring being wider than the port, cannot fly into the port so that most of, if not all, the bridges can, therefore, be removed from the ports, and, in order to do this, the ring must be balanced against the forces of steam which vary in volume and area under the ring at various positions of its stroke. At the same time a certain force must be exerted under the ring to expand it against its cage to prevent the chest pressure from passing the ring. I, therefore, so design my ring that it will be as nearly perfectly balanced as possible so that friction will be the minimum and that the wear of the cage will be uniform. This feature is of great importance, and its embodiment has not to my knowledge heretofore been attempted. To secure the best results in wear of the valve cage it should wear with greater friction when in extreme stroke, as it seldom runs there, and wear lightest in any travel less than extreme or full travel. After determining the requisite force to keep the ring steam-tight against the cage I put this area into the flange of the ring on the live steam side and properly lap this flange so steam cannot pass to the under side of the remainder of the ring. The outer edge (exhaust edge) being lapped as shown, it now remains to groove the outer surface so that as the valve moves in either direction an equal area of contact and pressure as predetermined shall remain until the valve reaches a position near full travel when it is advisable to allow the pressure and contact surface to increase to a limited degree.

The invention consists in certain novelties of construction and combinations of parts as hereinafter set forth and claimed.

The accompanying drawing illustrates an example of the physical embodiment of the invention constructed according to the best mode I have so far devised for the practical application of the principle.

Figure 1 is a vertical section of a steam chest showing the piston valve in elevation and in a central position, the valve mechanism being of the inside admission type. Fig. 2 is a section of part of one end of the valve. Figs. 3 and 4 show other positions of the valve relative to the port. Fig. 5 is a view of the joint plates used at the inner edge of a packing. Fig. 6 is a view of the joint plates used at the outer edge of a packing.

Referring to the several figures, the numeral 1 designates the steam chest; 2, the live steam cavity in connection with a source of steam supply; 3, 3, exhaust steam spaces; 4, the front steam port leading to the cylinder; 5, the back steam port leading to the opposite end of the cylinder; 6, 6, the cages or bushings, each being perforated in line with a port; 7, the valve spool; 8, 8, flanges each extending entirely around an end of the spool; 9, a series of holes through each flange; 10, 10, the followers; 11, the flange of each follower; 12, a hole through each follower; 13, a valve stem passed through the holes in the follower; 14, a nut on the end of the valve stem.

In designing the body of the valve proper there is formed between each flange 8 and each follower flange 11 a space 15, and between each flange 8 and each inner wall 16 of the follower a space 17 of greater depth than the space 15, as will be obvious from an inspection of the drawing. Within these spaces at each end are located the packing rings which project beyond the edges of the flanges 8 and 11 to the cage, as shown, the outer surface of each ring being in frictional contact with the inner surface of a cage or bushing. Each packing ring is made wider than a port so as to overlap it and so the packing cannot be forced into the port.

The numeral 18 designates a packing ring; 19, 19, the free ends of the ring; 20, two circular grooves adjacent the outer edges of a ring; 21, holes or openings from one of the grooves to the under surface of the ring; 22, a flange at the inner edge of each ring closely fitted within a space 17 and forming a steam-tight joint with flange 8 and the wall 16 of a follower; 23 is a bottom joint plate; and 24 a side joint plate at the free ends of the ring fitting a recess 25 in the side of the ring. These plates maintain a steam-tight joint when the packing ring expands and contracts. The joint plate 23 is located under the inner surface of said flange 22 and overlaps the free ends of the ring so a steam-tight joint is formed to prevent the passage of steam from the bottom of space 17 to the space 15 below the grooved portion of the packing or to the port. The plate 24 prevents steam passing from the live steam cavity to the port. The outer edge of the ring at its free ends is provided with a recess 26, as shown. A joint plate 27 fits the recesses at the edge of the ring. Another joint plate 28 is located at the inner surface of the ring and forms a steam-tight joint between a space 15 and the flange 11 of a follower. The spaces 15 and 17 beneath each packing ring are thus separated and steam can be admitted to said spaces only by way of holes 21 in the packing and the space between the free ends thereof, and holes 9 through the flange 8 of the spool. The outer periphery or surface of the packing ring between the circular grooves 20, 20 is provided with a series of V-shaped grooves 29, as shown by the several figures.

Live steam being admitted to cavity 2, it will pass through holes 9 in the flange 8 to spaces 17 and expand each packing against the inner surface of a cage, as is obvious (see Fig. 2). The outward pressure will, of course, depend upon the area of the inner surface of the flange 22, and this area is determined in view of the pressure desired. When that portion of the packing including the flange 22 is over a port, said portion obviously is balanced, as is also the part of the ring in contact with the cage above space 15 (see Fig. 3). When the packing is in the position shown by Fig. 4 the balance is still maintained by the presence of steam in the V-shaped grooves. The outer portion of each ring when over a port is balanced by the admission of steam to the space 15 through the open space between the free ends of the ring and holes 21 in the groove 20. When said portion moves to a position in contact with the inner surface of a cage and to the opposite side of a port, steam can pass from the space 15 below the packing and by the space between the ends of the packing ring to the groove 20 and sufficiently reduce the pressure of the said portion against the cage and substantially maintain the balance.

The width of the flange 22, the width of the grooves 20, and the number of the V-shaped grooves are determined by the width of the packing and the width of the port in each particular application and should be such as will maintain substantially equal areas of pressure of the packing ring against the cage at all positions of the valve relative thereto.

To recapitulate, in Fig. 2 steam pressure is under flange 22 only and in Figs. 3 and 4 steam pressure is under the right hand edge of the packing only. From the position shown in Fig. 4 the valve may be moved to the left as far as desired and back to its former position without changing the frictional area of the valve relative to the cage or materially varying the pressure of the same against the cage.

It is obvious that in lieu of the cages the metal of the steam chest each side of the ports may constitute bearing surfaces for the valve proper.

What I claim is:

1. The combination with a steam chest having ports and cages or bearing surfaces, of a piston valve provided at each end with recesses or spaces 15 and 17, the recess 17 being deeper than the recess 15; and packing rings within the said recesses, each of said packing rings having a single flange and a grooved outer surface, and the under surface of the flange in the space 17 being exposed to steam pressure when the valve is in operation.

2. The combination with a steam chest having ports and cages or bearing surfaces, of a piston valve provided at each end with recesses or spaces 15 and 17, the recess 17 being deeper than the recess 15; and packing rings within the said recesses; each of said packing rings being made integral and having free ends and provided at its inner and outer edges with plates to form steam-tight joints.

3. The combination with a steam chest having ports and cages or bearing surfaces, of a piston valve provided at each end with recesses or spaces 15 and 17, the recess 17 being deeper than the recess 15; and packing rings within the said recesses each having a single flange and a grooved outer surface; means, as holes 9 in flange 8, being provided for admitting steam under the inner edge of each packing ring.

4. The combination with a steam chest having ports and cages or bearing surfaces, of a piston valve provided at each end with recesses or spaces 15 and 17, the recess 17 being deeper than the recess 15; and packing rings within the said recesses; each of said packing rings having a grooved outer surface, and means for admitting steam to the grooves when the edge of the packing bears against the cage or bearing surface at the side of a port.

5. The combination with a steam chest having ports and cages or bearing surfaces, of a piston valve provided at each end with recesses or spaces 15 and 17, the recess 17 being deeper than the recess 15; and packing rings within the said recesses; each of said packing rings having V-shaped grooves at the central portion and each side of said V-shaped grooves a grooved outer surface, and means for admitting steam to the grooves when the edge of the packing bears against the cage or bearing surface at the side of a port.

6. A piston valve having a spool with a flange, as 8, at each end, and a follower at each end with a wall 16 and a flange 11; and a packing located between flange 8 and flange 11, said packing being provided with a flange located between flange 8 and wall 16; the said packing projecting beyond the flanges 8 and 11, as set forth.

7. A piston valve having a spool with a flange, as 8, at each end, and a follower at each end with a wall 16 and a flange 11; a packing located between flange 8 and flange 11, said packing being provided with a flange located between flange 8 and wall 16; and means for admitting steam beneath the flange of the packing.

8. A piston valve having a spool with a flange, as 8, at each end, and a follower at each end with a wall 16 and a flange 11; and a grooved packing located between flange 8 and flange 11, said packing being provided with a flange located between flange 8 and wall 16; means being provided for admitting steam beneath the flange and also from the port to a groove when the outer edge of the packing is at one side of a port.

9. A piston valve having packing rings at the ends, each provided with a single integral flange, means for admitting steam to the under surface of the flange of a packing ring permanently, and independent means for admitting steam to the inner surface of the opposite edge of the ring when the said edge is in a position over a port.

10. A piston valve having grooved packing rings at the ends, means for admitting steam to the under surface of one edge of a packing ring permanently, and independent means for admitting steam to a groove or grooves when the part of the packing containing the same is in a position at one side of a port.

11. A piston valve having packing rings at the ends, each packing ring having a groove at one edge of its outer surface, means for admitting steam to the under surface of one edge of the ring permanently, and independent means for admitting steam to the said groove when said groove is in a position at one side of a port.

12. A piston valve having packing rings at the ends, each ring having a groove at its inner edge and a groove at its outer edge, means for admitting steam to the under surface of one edge permanently, and independent means for admitting steam to a groove when the same is in a position at one side of a port.

13. The combination with a ported cage, of a piston valve having a packing ring with circumferential grooves, as 20; and means for permanently admitting steam to the under surface of one edge of the ring only.

14. A packing ring having circumferential grooves at the edges, as 20, and V-shaped grooves intermediate said grooves 20, for the purpose set forth.

15. A piston valve having a packing with circumferential grooves, and means for admitting steam to the under surface of one edge only of the packing permanently.

16. The combination with a steam chest having ports and cages or bearing surfaces, of a piston valve having packing rings at the ends each integral and provided with a flange 22; and independent means for balancing each edge of the packing ring when in a position at one side of a port.

17. The combination with a steam chest having a port therethrough and a circular bearing surface for a piston valve movable across the port, of a piston valve with an integral packing; joint plates at opposite edges of the packing; means for admitting steam under one edge only of the packing permanently; and means for balancing each edge when in a position at one side of the port.

In testimony whereof I affix my signature, in the presence of two witnesses.

JOHN T. WILSON.

Witnesses:
W. BRUCE HARLAN,
JNO. P. STEVENS.